ically coated polymers, so you United States Patent [19]
Herman et al.

[11] 3,884,871
[45] May 20, 1975

[54] PROCESS FOR COATING PIGMENT PARTICLES WITH ORGANIC POLYMERS

[75] Inventors: Daniel F. Herman, Princeton; Dominic Simone, Lyncroft, both of N.J.

[73] Assignee: N L Industries, Inc., New York, N.Y.

[22] Filed: June 29, 1973

[21] Appl. No.: 374,937

[52] U.S. Cl...... 260/42.14; 117/100 B; 260/29.6 R; 260/29.6 M; 260/29.6 E; 260/29.6 MM; 260/29.6 MP; 260/29.6 ME; 260/29.7 UA; 260/29.7 W; 260/42.16; 260/42.53
[51] Int. Cl. .......................................... C08f 45/04
[58] Field of Search ............ 260/41 R, 41 B, 42.53, 260/42.14, 42.16, 29.6 M, 29.6 MM; 117/100 B

[56] References Cited
UNITED STATES PATENTS

| | | | |
|---|---|---|---|
| 3,133,893 | 5/1964 | Newman | 260/41 |
| 3,471,439 | 10/1969 | Bixler et al. | 260/41 |
| 3,519,593 | 7/1970 | Bolger | 260/41 |

OTHER PUBLICATIONS
Patton, Temple C., Paint Flow And Pigment Dispersion, Interscience Pub., New York, 1964, pages 253–258.
The Condensed Chemical Dictionary, Sixth Edition, Reinhold Pub. Corp., New York, 1961, page 411.

*Primary Examiner*—James H. Derrington

[57] ABSTRACT

Dispersed solid particles of titanium dioxide pigment in water containing a dispersing agent are treated with an anchoring agent which is adsorbed on the pigment surface and is capable of copolymerization with other vinyl monomers. The desired monomer or mixture of monomers is added with a polymerization catalyst and heated to effect polymerization. Among the monomers employed are the acrylates, methacrylates, styrene, acrylonitrile, and vinyl sulfonate. The process provides for the coating of individual pigment particles without the undesirable coating of pigment agglomerates. Pigments coated by the process exhibit good dispersion and wetting properties when incorporated in vehicles such as paints and plastics.

7 Claims, No Drawings

PROCESS FOR COATING PIGMENT PARTICLES WITH ORGANIC POLYMERS

BACKGROUND OF THE INVENTION

This invention is concerned with a process for coating pigmentary particles with organic polymers and copolymers.

Titanium dioxide is well known in the art as a pigmentary ingredient in such compositions as paints, plastics, paper, rubber, ceramics, porcelain, enamel, and other applications. When this pigment is incorporated into an organic polymer vehicle such as those used in latex paint formulations, it is highly desirable to have good wetting of the pigment by the polymer vehicle and the formation of a strong adhesive bond between pigment and polymer vehicle for the integrity and durability of the paint film. Additionally, it is necessary to have a high degree of dispersion of the pigment in the vehicle to obtain full utilization of the light scattering properties of the pigment which results in coating compositions of uniform and improved hiding power.

In view of the foregoing, it has been desirable to treat pigment particles with an organic coating material before being dispersed in a polymeric paint vehicle. Such treatments improve wetting of the pigment surface with the polymeric vehicle and facilitate dispersion of the pigment. However, during the coating process, the pigment particles are often not uniformly dispersed in the reaction medium, and as a result, many particles will be coated as agglomerates or larger aggregate particles. In other cases, even when the pigment is well dispersed before the coating material is applied, the pigments are later agglomerated during the coating process itself. The resulting coated pigment agglomerates then become difficult to disperse in vehicle systems such as latex paints or plastics resulting in low hiding due to the insufficiency of the light scattering properties of the coated agglomerated particles. The agglomerated pigments behave much like large single pigment particles and lie outside the range of optimum light scattering.

The present invention is concerned with an efficient process for coating the surface of pigment particles such as titanium dioxide with polymers and copolymers which process substantially alleviates the aforementioned problem.

An object of this invention is to provide a process for coating dispersed solid particles such as titanium dioxide pigment particles with organic polymeric materials with minimal agglomeration of pigment particles during the coating process.

Another object of this invention is to provide a process for coating pigment particles with a polymeric material such that by varying the nature of the polymeric material, the pigment may be made oleophilic or hydrophilic in its behavioral properties.

The objects of this invention are accomplished by:
a. adding to a pigment and water slurry a dispersing agent equivalent to the dispersant demand of the pigment to form a pigment dispersion;
b. adding an anchoring agent to said pigment dispersion, said pigment adsorbing said anchoring agent;
c. adding an organic vinyl monomer to said dispersion; and
d. polymerizing said monomer and said anchoring agent in the presence of a polymerization catalyst to form a coating of said pigment particles with the formed organic polymers.

The dispersant demand of a pigment is the amount of dispersing agent solids, expressed as a percentage of pigment solids, necessary to produce minimum viscosity with maximum dispersion and deflocculation in a pigment-water slurry. By plotting a graph of the viscosity of a pigment and water slurry versus the percentage of dispersing agent solids added, the value of the dispersing agent where the viscosity of the dispersion is at a minimum is equal to the dispersant demand. Different grades of pigment have different dispersant demands for the same dispersant and by varying the type of dispersant, a single grade of pigment has different dispersant demands. In determining the dispersant demand of a pigment, the pigment is first added to water to provide about 70% pigment by weight of the mixture. The dispersing agent is next added with agitation and the viscosity determined using, for example, a Brookfield Viscometer. The addition of dispersing agent and the viscosity determination are repeated until minimum viscosity is obtained whereafter the viscosity will begin to rise again. The value of the dispersing agent percentage at this minimum viscosity is equivalent to the dispersant demand of the pigment. In some cases the viscosity curves defined by this procedure are rather broad at the minimum viscosity point so that the amount of dispersing agent solids may also be expressed as a range of values without being unduly inaccurate. The dispersing agents useful in this process are the inorganic dispersing agents such as sodium hexametaphosphate and potassium tripolyphosphate and the organic dispersing agents such as the sodium salt of polycarboxylic acid. Although these dispersing agents are most preferable in the practice of the invention, any water soluble polyanionic dispersing agent known to those skilled in the art for the dispersion of pigment particles in water may also be employed.

Table 1 below summarizes the dispersant demands for various titanium dioxide pigments with potassium tripolyphosphate (KTPP) the sodium salt of polycarboxylic acid (SSPA) and sodium hexametaphosphate (NaHMP). The term hydrous oxide as used in the table refers to the pre-treatments of titanium dioxide pigment with hydrated silica or alumina which are used to impart special properties to the pigment.

TABLE 1

| % $TiO_2$ | % Hydrous Oxide | % KTPP | % (SSPA)[1] | % Na-HMP |
|---|---|---|---|---|
| 98 | 2 | | | 0.150 |
| 95 | 5 | 0.303 | 0.50 | 0.165–0.330 |
| 92 | 8 | 0.30 | 0.20 | |
| 89 | 11 | 0.18 | 0.20–0.30 | 0.135–0.166 |
| 94 | 6 | 0.19 | 0.30 | |
| 93 | 7 | 0.17 | 0.20 | |

[1]Tamol 731 - Rohm and Haas Co.

It is extremely important to use well-dispersed pigment slurries to provide conditions for the coating of individual particles. If the pigment particles are permitted to flocculate or agglomerate in the slurry, they will be coated by the polymers to form coated aggregates. Good pigment dispersions in water can be attained by the instant process by first preparing a slurry of the pigment in deionized water, wherein the pigment comprises 70% of the weight of the slurry, containing an amount of dispersing agent equal to the dispersant demand of the pigment and throughly mixing the resulting dispersion.

The dispersion of pigment and water is preferably diluted to a concentration of between 15 and 30% of pigment by weight of the slurry by adding additional deionized water. Small amounts of additional dispersing agent may be optionally added. Such a concentration assures efficient polymerization of the reaction mixture.

The pigment and water dispersion can also be diluted with an aqueous medium containing an alcohol such as methyl alcohol, ethyl alcohol and isopropyl alcohol which are miscible with water and also dissolve the water insoluble vinyl monomers. Up to 50% by weight of the alcohol may be used based on the weight of total liquid in the diluted dispersion. It has been found that the presence of these alcohols aids in forming more uniform polymeric coatings from monomers having different solubilities in water. Methyl alcohol is preferred because the coating polymers formed are insoluble therein which facilitates isolation of the coated pigments. Additionally, methanol is beneficial when high acrylic polymers are used such as 2-ethylhexyl acrylate and butyl acrylate. The methyl alcohol prevents swelling of the polymers which many other alcohols do not prevent.

Next is added an anchoring agent which is capable of anchoring or bonding the coating polymers onto the surface of the pigment. The presence of an anchoring agent is necessary to anchor the final polymer coating onto the pigment surface and to insure that all the pigment particles are uniformly coated. If the monomer or monomer mixture forming the coating compositions do not contain such an agent, the resulting products will be a mixture of partially coated pigments containing agglomerates of free polymer. Suitable anchoring agents are organic vinyl monomers containing polar groups which are strongly adsorbed on the pigment surface and can also enter the polymerization with the monomers to form the coating composition. Such polar groups can be represented by the formulae; COOH,

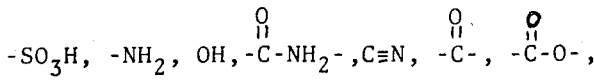

and $NO_2$.

The anchoring agents may be added before or together with the monomers of the coating compositions since they will be preferentially adsorbed on the pigment surface. When the monomers are added separately to the aqueous dispersion of pigment and anchoring agent, sufficient time, usually 5 to 10 minutes, is allowed for the adsorption of the anchoring agent upon the surface of the pigment before the monomers are added. An adsorption isotherm may be used to determine the amount of anchoring agent adsorbed on the pigment surface. This is accomplished by dispersing the pigment in water, adding the anchoring agent, and allowing time for the equilibrium to take place between the anchoring agent and the pigment surface. The amount of anchoring agent required is determined by plotting the value of the ratio of the weight of the anchoring agent in grams to the weight of pigment in grams versus the equilibrium concentration of the anchoring agent in moles per liter. Additional anchoring agent is added to the aqueous pigment dispersion until the anchoring agent-pigment weight ratio becomes constant which indicates that all pigments has adsorbed the anchoring agent. Preferable anchoring agents are the acrylic and methacrylic acids and their sodium salts, hydroxyethylmethacrylate, aminoacrylates, and sodium vinylsulfonate. In the practice of this invention, an amount of anchoring agent in excess of the amount required by the adsorption isotherm may be used. The excess is employed when it is desired to have the coated pigment dispersed in a polar medium such as water because the excess polar groups of the anchoring agent aid in the dispersability of the coated pigments. If the coated pigments are to be dispersed in a non-polar medium such as polyvinyl chloride or polyethylene then an amount of anchoring agent equal to the amount required by the adsorption isotherm is employed. The amount of anchoring agent required by the adsorption isotherm is generally from 0.5 to 1% of the weight of the pigment depending on the type of pigment and the medium in which the final coated pigment is to be dispersed.

The monomers useful in this process are organic vinyl monomers capable of polymerization and these monomers may be the same as the anchoring agents described above. They include sodium acrylate, sodium methacrylate, acrylic acid, methacrylic acid, alkylacrylates and methacrylates, hydroxy ethyl methacrylate, ethyl hexyl acrylate, aminoacrylates and methacrylates, styrene, 2-methyl styrene, styrene sulfonic acid, sodium vinyl sulfonate, acrylonitrile, methacrylonitrile, vinyl chloride, vinylidene chloride and mixtures thereof. The terms alkyl acrylate and alkyl methacrylate are meant to include alkyl esters of acrylic acid and methacrylic acid wherein said alkyl group is composed of straight chain or branched chained hydrocarbons containing from 2 to about 20 carbon atoms.

After addition of the polymerization catalyst to the dispersion, the mixture is heated to effect polymerization of the monomers together with copolymerization of the anchoring agent.

These monomers can be homopolymerized or copolymerized in various combinations and ratios to yield coated pigment compositions having the desired wetting and dispersion properties. A guide for the selection of the proper monomer or combination of monomers is the polarity of the medium in which the coated pigment is to be ultimately dispersed. For example, if it is desired to have the coated pigment dispersible in a high polar medium such as water, as in the case of latex paints, then the pigment should be coated with homopolymers of sodium acrylate, sodium methacrylate, acrylic acid, methacrylic acid, sodium vinyl sulfonate and styrene sulfonic acid or their copolymers with the acrylates, methacrylates or styrene. If acrylic acid, methacrylic acid or styrene sulfonic acid is used, the product should be neutralized with an inorganic or organic base such as sodium hydroxide, ethylamine or morpholine after polymerization is complete. The weight of monomer useful in coating the pigments is from 1 to 60% of the weight of the pigment. A crosslinking agent such as ethylene dimethacrylate or divinylbenzene should also be added together with the monomers to insure formation of water insoluble coatings. Such an addition may often be necessary to prevent the resulting polymers from being swollen by water or, in the case where the polymers themselves are water soluble, to prevent the polymer coating from being washed off the pigment. The amount of crosslinking agent used is generally from 5 to 20% of the total weight of monomers and anchoring agent and preferably from 5 to 15%.

If the pigment is to be dispersed in a non-polar medium such as plastics then the pigment is preferably coated with polymers of styrene, 2-methyl styrene, vinyl chloride, stearyl methacrylate, butyl methacrylate and mixtures thereof.

The catalysts used for the polymerization can be any of the known free radical polymerization catalysts. Among these are, for instance, benzoyl peroxide, azobisisobutyronitrile, or ammonium or potassium persulfate in combination with sodium bisulfite. The useful amount of catalyst is in a range of 0.01 and 2% of the weight of monomer and preferably about 0.10 to 1.0% by weight of monomer.

The polymerization temperature is preferably the reflux temperature of the reaction mixture. However, temperatures 15° to 20°C below the reflux temperature can be used without effecting the reaction time severely. The reaction proceeds satisfactorily at room temperature although higher temperature conditions up to the boiling point may be used. The optimum temperature of the polymerization reaction depends on the specific catalyst and monomer being employed.

When using normally gaseous monomers such as vinyl chloride, the monomer is liquified and injected into a pressure vessel containing the pigment dispersion, anchoring agent, and catalyst and then polymerized.

Coated pigments containing from 0.5 to 50% polymer by weight of the pigment can be prepared by the instant process.

When forming a high polymer content coated pigment, the monomer is preferably added slowly and continuously.

The time necessary to effect polymerization will vary according to the reaction conditions employed, but is between one and five hours in most cases.

The polymerization of the monomers can be brought to completion by allowing enough time for the reaction, or if preferred, the reaction can be stopped after the polymerization is 50 to 80% complete. The unreacted monomer or monomers can then be distilled off and the product can be washed with a suitable solvent such as methanol to remove unreacted monomers.

The product, consisting of discrete particles made up of pigment particles individually coated with the polymeric material is then filtered and dried.

After drying, the coated pigment particles may be steam micronized to provide ample separation of any flocculated product formed during drying. The pigment particles can be subjected to thermogravimetric analysis to determine the polymer content of the pigment coating. The particle size diameter of the pigment is measured before and after coating by light scattering methods to determine if the pigment is substantially coated as single particles. Electron microscopy was used to determine if all pigment particles have been uniformly coated.

It was found that many of the pigmentary particles measured were 0.25 to 0.26 $\mu$ in diameter both before and after coating indicating minimal agglomeration during the coating process.

The pigments of the present invention include pure titanium dioxide pigments and hydrous oxide treated titanium dioxide pigments.

In order to more clearly disclose the nature of the present invention, specific examples are hereinafter given.

EXAMPLE 1

Exactly 600 g. of titanium dioxide pigment, containing 89% $TiO_2$ and 11% hydrous oxides, was dispersed in 257 g. of deionized water containing 0.99 g. of sodium hexametaphosphate using a high speed dispersator for 30 minutes. The slurry was transferred into a reaction flask and diluted with 2143 g. of water containing 0.81 g. of sodium hexametaphosphate. A mixture consisting of 3.7 g. of methacrylic acid, 11.3 g. of methyl methacrylate and 1.8 g. of ethylenedimethacrylate (EDMA) crosslinking agent was added, followed by the addition of 0.198 g. of potassium persulfate and 0.999 g. of sodium bisulfite catalyst dissolved in 20 g. of water. The temperature was raised to 80°C and kept constant for 2½ hours. At the end of this period the temperature was raised to the boiling point of the mixture and the unreacted monomers distilled off. The mixture was cooled to room temperature, neutralized with NaOH to pH-7 and the product was filtered and dried.

Polymer content determination by thermal gravimetric analysis indicated that the pigment had been coated with 2.5% of a copolymer of methyl methacrylate and methacrylic acid.

Measurements by a light scattering method gave mean particle diameters of 0.25–0.26$\mu$ for the dispersed pigment before and after being polymer coated which indicated no agglomeration.

The electron microscope examination of the product indicated that the pigment was essentially uniformly coated by the polymer.

The wetting and the dispersion characteristics of the coated pigment was improved as compared to an uncoated control. While a 70% dispersion of the control pigment in water had no liquid flow, a 70% dispersion of the coated pigment in water had a Brookfield viscosity of 188 cps indicating improved wetting and dispersion characteristics.

Latex paints formulated with the coated pigment had improved tinting strength and hiding power compared to equivalent paints containing uncoated pigments.

EXAMPLE 2

This example illustrates the use of methacrylic acid as both the anchoring agent and the vinyl monomer for coating titanium dioxide pigment. The procedure of Example 1 was followed using a mixture of 18 g. of methacrylic acid instead of the methyl methacrylate and methacrylic aid of Example 1. The amount of ethylene dimethacrylate used was 1.8 g. or 10% of the weight of methacrylic acid. The coated pigments recovered contained 2.3% methacrylic acid polymer crosslinked with ethylene dimethacrylate. Electron microscope examination indicated that the product consisted of pigment particles coated with the copolymer.

The wetting and the dispersion characteristics of the coated pigment in water were improved as compared to an uncoated control. Without any addition of wetting or dispersing agent, a 70% water dispersion of the coated pigment had a Brookfield viscosity of 152 cps.

Improvements in tinting strength of latex paints containing the coated pigment were observed.

Particles size determination of the coated pigment indicated a mean diameter of 0.25μ both before and after being polymer coated.

EXAMPLE 3

This example illustrates the use of methyl methacrylate as the vinyl monomer and sodium methacrylate as the anchoring agent for coating titanium dioxide pigment.

The procedure of Example 1 was followed using a mixture of 4.1 g. of sodium methacrylate and 12.4 g. of methyl methacrylate instead of the methyl methacrylate and methacrylic acid of Example 1. Ethylene dimethacrylate (1.7 g.) was used as the crosslinking agent. The coated pigments after isolation contained 2.75% of a copolymer of methyl methacrylate and sodium methacrylate, crosslinked with ethylene dimethacrylate.

The particle size determination and the electron microscope examination indicated that the pigment particles were individually coated with the copolymer.

Without the addition of any wetting or dispersing agent, a 70% water slurry of the coated pigment had a Brookfield viscosity of 478 cps indicating vastly improved wetting and dispersibility as compared to an uncoated control pigment.

Particle size determination of the coated pigment indicated a mean diameter of 0.25μ. both before and after coating.

EXAMPLE 4

This example illustrates the coating of $TiO_2$ pigment with a copolymer of styrene and 2-ethylhexylacrylate using methacrylic acid as the anchoring agent. Exactly 600 g. of titanium dioxide pigment containing 89% titanium dioxide and 11% hydrous oxide was dispersed in 257 g. of deionized water containing 7.2 g. of a 25% solution of the sodium salt of a polycarboxylic acid (TAMOL 731, Rohm & Haas Co.) which is the equivalent of 1.8 g. of the sodium polycarboxylate. The pigment slurry was transferred into a reaction flask and diluted with 2743 g. of deionized water. Then 3 g. of methacrylic acid was added followed by the addition of a mixture of 37 g. of styrene and 37 g. of 2-ethyl hexyl acrylate monomers containing in solution 0.6 g. of benzoyl peroxide. The mixture was heated to 90°C for 4½ hours. The reaction mixture was filtered and washed with methanol and then dried in an oven. The pigment was found to be coated with 10.5% of a copolymer of styrene-2-ethyl hexyl acrylate, and methacrylic acid.

EXAMPLES 5-8

A titanium dioxide pigment containing 95% $TiO_2$ and 5% hydrous oxide was coated with various amounts of a copolymer of methylmethacrylate and methacrylic acid crosslinked with ethylene dimethacrylate using the procedure of Example 1. The weight ratio of the two monomers was 3:1 and 10% of ethylene dimethacrylate was used as the crosslinking agent. Sodium hexametaphosphate (5.0 g.) was required as the dispersant demand of a 70% pigment-water slurry containing 1500 g. of pigment. The pigment was coated with 2.45%, 5.35%, 12.56% and 23.75% by weight of the copolymer respectively. The ratio of methyl methacrylate to methacrylic acid in the monomer was 3:1.

Table 2 shows the results of these experiments.

TABLE 2

| Example | Amount of Polymer | Average Particle Size |
|---|---|---|
| 5 | 2.45% | 0.26μ |
| 6 | 5.35% | 0.26μ |
| 7 | 12.56% | 0.25μ |
| 8 | 23.75% | 0.26μ |

EXAMPLES 9-12

A titanium dioxide pigment containing 89% titanium dioxide and 11% hydrous oxide was coated with various amounts of copolymer of methyl methacrylate and methacrylic acid crosslinked with 10% ethylene dimethacrylate as in Example 1. Sodium hexametaphosphate (2.5 g.) was required as the dispersant demand of a 70% pigment water slurry containing 1500 g. of pigment. The ratio of methyl methacrylate to methacrylic acid in the monomer charge was 3:1. The pigment was coated with 2.7%, 5.4%, 13.3% and 24.3% of the copolymer.

EXAMPLE 13

Using the procedure of Example 1, 600 g. of a titanium dioxide pigment containing 100% titanium dioxide was coated with 2.1% of a copolymer of methyl methacrylate and methacrylic acid. Exactly 13.5 g. of methyl methacrylate and 4.5 g. of methacrylic acid and 1.8 g of EDMA were added simultaneously. The amount of sodium hexametaphosphate required as the dispersant demand of the 70% pigment and water slurry was 0.99 g. After neutralization with sodium hydroxide, the product was filtered and dried. The coated pigment was formulated in a latex paint and showed an improvement of 50% in hiding power as compared to the uncoated control pigment.

EXAMPLES 14-16

This example illustrates the use of sodium vinyl sulfonate as the anchoring agent and methyl methacrylate as the coating polymer.

The procedure of Example 1 was followed using 600 g. of a titanium dioxide pigment containing 95% $TiO_2$ and 5% hydrous oxide. Three experiments were performed wherein the weight ratios of methyl methacrylate to sodium vinyl sulfonate were varied. In the first experiment 12.6 g. of methyl methacrylate and 5.4 g. of sodium vinyl sulfonate were added. In the second 11.0 g. of methyl methacrylate and 7.0 g. of sodium vinyl sulfonate were added and in the third 7.0 g. of methyl methacrylate and 10.0 g. of sodium vinyl sulfonate were added. The 70% pigment and water slurries required 0.99 g. of sodium hexamethaphosphate as the dispersant demand. The pigments after isolation were each uniformly coated with about 3% of a copolymer of methyl methacrylate and sodium vinyl sulfonate.

EXAMPLES 17-19

This example illustrates the use of a copolymer of stearyl methacrylate and methyl methacrylate as the coating polymers and methacrylic acid as the anchoring agent.

The procedure of Example 1 was followed using 600 g. of a titanium dioxide pigment containing 95% $TiO_2$ and 5% hydrous oxide. Three experiments were performed wherein the weight ratios of methyl methacrylate to stearyl methacrylate were varied. In the first experiment 13.5 g. of methyl methacrylate and 4.5 g. of stearyl methacrylate were added. In the second, 9.0 g. of methyl methacrylate and 9 g. of stearyl methacrylate were added and in the third, 6 g. of methyl methacrylate and 12. g. of stearyl methacrylate were added. Methacrylic acid, 2.94 g. was added each time with the monomers as the anchoring agent. The 70% pigment and water slurries required 1.44 g. of sodium hexametaphosphate as the dispersant demand. The pigments after isolation were coated with 3% of a copolymer of methyl methacrylate, stearyl methacrylate and methacrylic acid. The coated pigments were evaluated for dispersion properties in polyethylene, polystyrene and polyvinyl chloride. All showed improved dispersion characteristics as compared to the control uncoated pigment.

EXAMPLE 20

This example illustrates the process for coating $TiO_2$ pigment with methyl methacrylate using sodium methacrylate as the anchoring agent in a 35% aqueous methanol solution.

Titanium dioxide pigment (500 g.) containing 98% $TiO_2$ and 2% hydrous oxide was dispersed in 214 g. of deionized water containing 0.750 g. of sodium hexametaphosphate. The slurry was transferred into a reaction flask and diluted with 1627 g. of water and 992 g. of methanol. Methacrylic acid, 18.5 g., neutralized with sodium hydroxide to a pH of 7 was added followed by the addition of 166.4 g. of methyl methacrylate, 0.5577 g. of ammonium persulfate and 0.2788 g. of sodium bisulfite. The mixture was heated at 75°C for 4 hours. The mixture was cooled to room temperature and the product was filtered and washed with water. The product consisted of pigment coated with 24% of a copolymer of methyl methacrylate and sodium methacrylate. The coated pigment had excellent dispersing characteristics in latex paints.

EXAMPLE 21

The procedure of Example 20 was followed using 10.71 grams of methacrylic acid neutralized with NaOH as the anchoring agent and 96.4 grams of methyl methacrylate as the coating monomer. Ammonium persulfate, 0.32 g. and sodium bisulfite, 0.16 g., was used as the catalyst. The isolated product consisted of a polymer coated pigment containing 14% polymer by weight.

EXAMPLE 22

This example illustrates the coating of a titanium dioxide pigment with 24.5% of a copolymer of 2-ethylhexylacrylate, methyl methacrylate and methacrylic acid.

The procedure of Example 20 was followed using 74.0 grams of 2-ethylhexyl acrylate, 107 grams of methyl methacrylate and 3.70 grams of methacrylic acid instead of methyl methacrylate and the sodium methacrylate of Example 20.

The product consisted of a coated pigment containing 24.5% copolymer.

EXAMPLE 23

This example illustrates the use of hydroxyethylmethacrylate as the anchoring agent and methylmethacrylate as the coating polymer.

The procedure of Example 20 was followed using 18.49 g. of hydroxy ethylmethacrylate as the anchoring agent instead of sodium methacrylate. The product consisted of a polymer coated pigment containing 25% of a copolymer of hydroxethylmethacrylate and methylmethacrylate.

EXAMPLE 24

This example illustrates the use of a copolymer of butyl methacrylate and methylmethacrylate as the coating polymer.

The procedure of Example 20 was followed using a mixture of 129.5 g. of butyl methacrylate and 37 g. of methyl methacrylate instead of the methylmethacrylate of Example 20. The product consisted of a coated pigment containing 24% of a copolymer of butyl methacrylate, methyl methacrylate and sodium methacrylate.

EXAMPLE 25

This example illustrates the process for coating $TiO_2$ pigment with methyl methacrylate and methacrylic acid in a 50% aqueous methanol solution.

Titanium dioxide pigment (500 g.) containing 98% $TiO_2$ and 2% hydrous oxide was dispersed in 214 g. of deionized water containing 0.750 g. of sodium hexametaphosphate. The slurry was transferred into a reaction flask and diluted with 1202.4 g. of water and 1414.7 g. of methanol. Methacrylic acid (50 g.) and methyl methacrylate (450 g.) were added simultaneously to the reaction mixture followed by the addition of 1 g. of ammonium persulfate and 0.5 g. of sodium bisulfite. The mixture was heated to 75°C for 4 hours and then cooled to room temperature. After neutralization with sodium hydroxide, the product was filtered and washed with water. The product after drying consisted of a pigment coated with 48% of a copolymer of methyl methacrylate and methacrylic acid.

What is claimed is:

1. A process for the coating of titanium dioxide pigment particles to form discrete pigment particles individually coated with organic polymers which comprises the steps of:
   a. adding to a water slurry of titanium dioxide pigment particles wherein said particles comprise 70% by weight of said slurry, a polyanionic dispersing agent selected from the group consisting of sodium hexametaphosphate, potassium tripolyphosphate, and sodium salt of polycarboxylic acid in an amount equivalent to the dispersant demand of the particles to form a water dispersion wherein the dispersant demand is from 0.15 to 0.50 weight percent of the amount of particles and thereby maintaining said dispersion at a minimum viscosity;
   b. diluting said water dispersion with an aqueous medium until said particles comprise from 15 to 30% by weight of said dispersion;
   c. adding an anchoring agent to said dispersion; said anchoring agent comprising an organic vinyl monomer containing polar groups which are adsorbed on the surface of said particles; said anchoring agent being capable of polymerization with vinyl monomers;

d. adding an organic vinyl monomer to said dispersion;

e. polymerizing said monomer and said anchoring agent in the presence of a polymerization catalyst thereby coating said individual and discrete pigment particles with the formed organic polymers;

f. and filtering and drying the product of step (e).

2. The process of claim 1 wherein said aqueous medium contains up to 50% by weight of an alcohol selected from the group consisting of methyl alcohol, ethyl alcohol, propyl alcohol and isopropyl alcohol.

3. The process of claim 1 wherein said anchoring agent and said vinyl monomer are added simultaneously to said water dispersion; said particles preferentially adsorbing said anchoring agent.

4. The process of claim 1 wherein a crosslinking agent is added with said vinyl monomer to said dispersion in an amount from 5 to 20% of the weight of said monomer.

5. The process of claim 1 wherein said pigment particles are titanium dioxide pigment particles treated with hydrous oxides.

6. The process of claim 1 wherein said anchoring agent is selected from the group consisting of methacrylic acid, sodium methacrylate, acrylic acid, sodium acrylate, hydroxyethylmethacrylate and sodium vinyl sulfonate.

7. The process of claim 1 wherein said organic vinyl monomer is selected from the group consisting of sodium acrylate, sodium methacrylate, acrylic acid, methacrylic acid, alkyl acrylates, alkyl methacrylates, amino acrylates, amino methacrylates, styrene, 2-methyl styrene, styrene sulfonic acid, sodium vinyl sulfonate, acrylonitrile, methacrylonitrile, vinyl chloride, vinylidene chloride and mixtures thereof.

* * * * *